United States Patent Office 3,458,511
Patented July 29, 1969

3,458,511
COOLING OFFGAS OBTAINED IN THE SYNTHESIS OF MELAMINE
Guenther Hamprecht, Munich-Untermenzing, Rudolf Mohr, Lampertheim, Hesse, Dieter Fromm, Ludwigshafen (Rhine), Matthias Schwarzmann, Limburgerhof, Pfalz, and Ludwig Vogel, Frankenthal, Pfalz, Germany, assignors to Badische·Anilin- & Soda-Fabrik Aktiengesellschaft, Ludwigshafen (Rhine), Germany
No Drawing. Filed Aug. 2, 1967, Ser. No. 657,790
Claims priority, application Germany, Aug. 9, 1966, B 88,397
Int. Cl. C07d 55/28
U.S. Cl. 260—249.7        4 Claims

ABSTRACT OF THE DISCLOSURE

The offgas obtained in the synthesis of melamine by heating urea is cooled to temperatures of 180° to 280° C. to separate the melamine. Further cooling of the offgas is effected by treating the offgas with melts which contain urea and also ammonium salts and/or guanidine salts which are soluble in urea. The temperature of the melt in the treatment of the offgas should be above the decomposition temperature of ammonium carbamate.

---

It is known that melamine can be separated from gases containing the same which have been obtained by heating urea in the presence of ammonia and catalysts at temperatures of 320° to 450° C., by cooling these gases to temperatures of 180° to 280° C. cooling is advantageously carried out by mixing them with a colder stream of gas. The coolant may be ammonia or inert gas. It is advantageous however to use as the coolant the offgas which has been freed from melamine and unreacted urea and which consists essentially of a mixture of ammonia and carbon dioxide. This has the advantage that the offgas is not diluted by extraneous gases and may therefore be introduced again as fluidizing gas or carrier gas for melamine into the reaction zone so that practically no additional ammonia is necessary for the synthesis.

It is also known that for further cooling and to separate and recover the unreacted urea the offgas freed from melamine may be brought into contact with a urea melt (which may contain biuret) at temperatures of about 120° to 140° C. The offgas is thus cooled to 130° to 140° C. If this offgas freed from melamine and urea is to be used for example for cooling synthesis offgas to separate melamine, it is necessary to use considerable amounts because separation of melamine, in order to avoid loss of melamine, is in general carried out at temperatures of about 200° C. so that there is only a small difference in temperature between the offgas to be cooled and the coolant. The amount of offgas required may obviously be decreased by lowering its temperature. This may be achieved for example by using a cooling system. Since the offgas always contains small amounts of urea, however, the cooling surfaces would become coated with urea in the course of time so that periodic cleaning of the coolers would be necessary and, because of the poor heat transfer between the hot gas and the cooling surfaces coated with urea, large heat exchange surfaces would be necessary.

It is an object of the present invention to provide a process for further cooling offgas obtained in the synthesis of melamine which has been freed from melamine by cooling. It is a special object of the present invention to provide a process for cooling said offgas to a temperature below 120° C. These objects are achieved by treating the offgas with a melt which contains urea and also an ammonium salt and/or a guanidine salt which is soluble in molten urea, and keeping the temperature of the melt close above the decomposition temperature of ammonium carbamate.

Cooling of the offgas according to this invention may be carried out immediately after the stage in which the melamine is separated. It is also possible however for the offgas to be washed in conventional manner with a melt of urea which may contain biuret after the separation of melamine and prior to the cooling of the offgas according to this invention. In the latter method, about 90% of the unreacted urea is recovered by means of the urea washing and may therefore be returned immediately to the synthesis, while the remaining 10% of unreacted urea occurs in the washing according to this invention and is separated from the melt.

The melt containing urea and an ammonium salt and/or guanidine salt advantageously contains urea in an amount of 10 to 90%.

Mixtures of urea and ammonium salts and/or guanidine salts which are soluble in molten urea form eutectics having very low melting points. Examples of salts are ammonium salts and guanidine salts of nitric acid, thiocyanic acid, formic acid and acetic acid. Ammonium nitrate, ammonium thiocyanate and guanidine thiocyanate may be used with particular advantage.

The hitherto unknown eutectic of 55% by weight of urea and 45% by weight of ammonium thiocyanate, for example, melts at 29° C. and the mixture of 25% by weight of ammonium nitrate, 30% by weight of ammonium thiocyanate and 45% by weight of urea (which hitherto was also unknown) melts at 11° C. and is therefore liquid at room temperature in a wide concentration range. A melting point of 60° C. is measured for a mixture of 55% by weight of ammonium acetate and 45% by weight of urea. The eutectic mixture of 55% by weight of guanidine thiocyanate and 45% by weight of urea has a melting point of 47° C. The eutectic of 44% by weight of urea and 50% by weight of ammonium nitrate has a melting point of 28° C. Small amounts of biuret, cyanuric acid, thiourea and substances which are either contained in the offgas or are formed therefrom with the melts according to this invention, are not troublesome.

Separation of the urea taken up by the melt is particularly simple when melts are used which have a content of urea which is above that of the eutectic. This means that melts are advantageously used having a maximum urea content of 90% down to the urea content of the eutectic concerned. Urea can be separated from these melts in a coarsely crystalline and readily centrifuged form by simple cooling. The melt adhering to the urea separated may be removed by washing with liquid ammonia or with an alkanol having one to four carbon atoms. After the solvent has been evaporated, the melt can be returned to the washing. The recovered urea may be dried and if desired returned to the synthesis.

The lower limit of the coolant temperature which can be achieved is not determined by the solidification temperature of the said melt, but by the temperature at which solid ammonium carbamate separates therefrom. At standard pressure this temperature is about 60° C. To prevent separation of ammonium carbamate, the temperature of the melt should always be above the decomposition point of ammonium carbamate, for example up to 40° C., advantageously up to 15° C., above the said point, i.e. by using temperatures of about 60° to 75° C. which are advantageous when working at atmospheric pressure. Under superatmospheric pressure the temperature has to be raised accordingly so that the decomposition pressure of the carbamate exceeds the working pressure used. By treating the gas with the melts in accordance with this invention at low pressure, it is obviously possible to achieve a further lowering of the coolant temperature.

The use of the melts according to this invention as wash liquids has the great advantage that they have practically no vapor pressure in the specified range of temperature. The offgas is therefore not contaminated by extraneous substances and may be returned to the synthesis.

To avoid corrosion in the apparatus, they may be coated with rubber or corrosion-resistant plastics or may be made from corrosion-resistant materials, such as aluminum, alloys of aluminum and magnesium, titanium, ferrosilicon or carbon materials.

The invention is illustrated by the following examples.

EXAMPLE 1

100 kg. of urea melt together with 351 kg. of a gas mixture of 2 parts by volume of ammonia and 1 part by volume of carbon dioxide is converted per hour in a fluidized-bed reactor in the presence of an aluminum oxide catalyst into melamine to an extent of more than 95%. The filtered hot synthesis gas is cooled to 200° C. by mixing with it gas at 70° C. consisting of 2 parts by volume of ammonia and 1 part by volume of carbon dioxide. Melamine is thus condensed out and deposited. The offgas which still contains urea in the form of ammonia and isocyanic acid is then washed in two stages by direct heat exchange with a melt at 65° C. of 67% by weight of urea, 28% by weight of ammonium thiocyanate and 4% by weight fo ammonia and thus cooled to 70° C. The heat absorbed by the melt is removed in a heat exchanger by evaporative cooling.

20 kg. of melt per hour is removed through a trap and cooled to 35° to 40° C. The urea which separates in coarse crystalline needles from the melt together with its pyrolysis products is centrifuged off and washed free from thiocyanate with about twice its weight of alcohol. The melt recovered by evaporation of the alcohol is returned with the melt from the centrifuge to the washing cycle. The urea separated is dried together with the pyrolysis products and fed into the melamine reactor in molten condition.

Of the total hourly amount of offgas (910 kg.) which is at a temperature of 70° C., 351 kg. is introduced into the reactor as fluidizing and sweeping gas and 505 k.g. is used as coolant for separation of melamine. The remainder of the offgas is processed to exploit its ammonia content, for example by the manufacture of fertilizers.

EXAMPLE 2

The synthesis gas is cooled to 200° C. with coolant consisting of a mixture of ammonia and carbon dioxide as described in Example 1 and the melamine is deposited. The hot offgas at a temperature of 200° C. is then cooled to 135° C. with a urea melt which contains biuret and is at 132° C. as described in German patent specifications No. 1,204,679. Melamine contained according to the vapor pressure in the offgas is thus absorbed quantitatively and the unreacted urea to the extent of more than 90% by the melt. 100 kg. of melt is withdrawn from the recycled urea each hour and supplied to the melamine reactor, being replenished by 96 kg. per hour of fresh molten urea.

The offgas at 135° C. separated from the urea melt is washed as described in Example 1 with a melt at 67° C. of urea, ammonium thiocyanate and ammonia and thus cooled to 70° C. The remainder of the urea is thus separated quantitatively. To maintain a constant urea content in the melt, 0.4 kg. of urea per hour is separated therefrom as described in Example 1.

EXAMPLE 3

Offgas at 135° C., obtained as in Example 2, is cooled to 70° C. with a melt of 15.5 parts by weight of ammonium nitrate, 18.5 parts by weight of ammonium thiocyanate, 64 parts by weight of urea and 2 parts by weight of ammonia which is at 67° C. and thus freed from its urea content. The heat absorbed by the melt is withdrawn in a heat exchanger by evaporative cooling. To maintain a constant urea content in the melt, 1.4 kg. of melt is removed per hour through a trap from the cycle and cooled to 20° C. The deposited urea and its pyrolysis products are separated, washed with ethanol and dried and returned to the melamine reactor. The melt freed from solvent is returned to the washing cycle.

EXAMPLE 4

Offgas at 135° C., obtained according to Example 2, is cooled to 70° C. with a melt of 55 parts by weight of urea and 45 parts by weight of ammonium nitrate which is at 67° C., and thus freed from the remainder of the urea The heat absorbed by the melt is withdrawn in a heat exchanger by evaporative cooling. To maintain a constant urea content, 4 kg. of melt is removed per hour through a trap from the melt cycle and cooled to 48° C. so that 0.4 kg. of urea is deposited. The deposited urea is returned to the melamine reactor and the melt is returned to the cycle.

EXAMPLE 5

9 kg. per hour of offgas obtained at 200° C. according to Example 1 and freed from melamine is washed by direct heat exchange with a melt at 65° C. having the composition: 52% by weight of urea and 48% by weight of guanidine thiocyanate, and thus cooled to 70° C.

0.5 kg. of melt is removed through a trap per hour from the washing cycle and cooled to 50° C. The urea thus deposited from the melt is centrifuged off and washed with a little alcohol to free it from thiocyanate. Guanidine thiocyanate is recovered from the washing alcohol and returned to the washing cycle.

The recovered urea is dried, melted and fed again into the melamine reactor.

We claim:

1. A process for cooling offgas obtained by the thermal decomposition of urea to form melamine and separation of the melamine formed by cooling the synthesis gas to temperatures of 180° to 280° C., which comprises further cooling said synthesis gas by treating the same with melts containing urea and ammonium salts and/or guanidine salts, said salts being soluble in molten urea, and keeping the temperature close above the decomposition temperature of ammonium carbamate.

2. A process as claimed in claim 1 wherein said ammonium or guanidine salt is a member of the group consisting of ammonium nitrate, ammonium thiocyanate, ammonium formate, ammonium acetate, guanidine thiocyanate, guanidine formate and guanidine acetate.

3. A process as claimed in claim 1 wherein said melt contains from 10 to 90% by weight of urea.

4. A process as claimed in claim 1 wherein the temperature of the melt is kept in the range between the decomposition temperature of ammonium carbamate and 40° C. above said decomposition temperature.

References Cited

UNITED STATES PATENTS

| | | | |
|---|---|---|---|
| 2,698,344 | 12/1954 | Mills et al. | 260—249.7 XR |
| 3,328,401 | 6/1967 | Marten | 260—249.7 |
| 3,386,999 | 6/1968 | Manes | 260—249.7 |

JOHN D. RANDOLPH, Primary Examiner

J. M. FORD, Assistant Examiner

U.S. Cl. X.R.

252—182; 260—564